Jan. 30, 1934. S. S. SWANSON ET AL 1,945,125
MANURE SPREADER
Original Filed Aug. 12, 1931 3 Sheets-Sheet 2
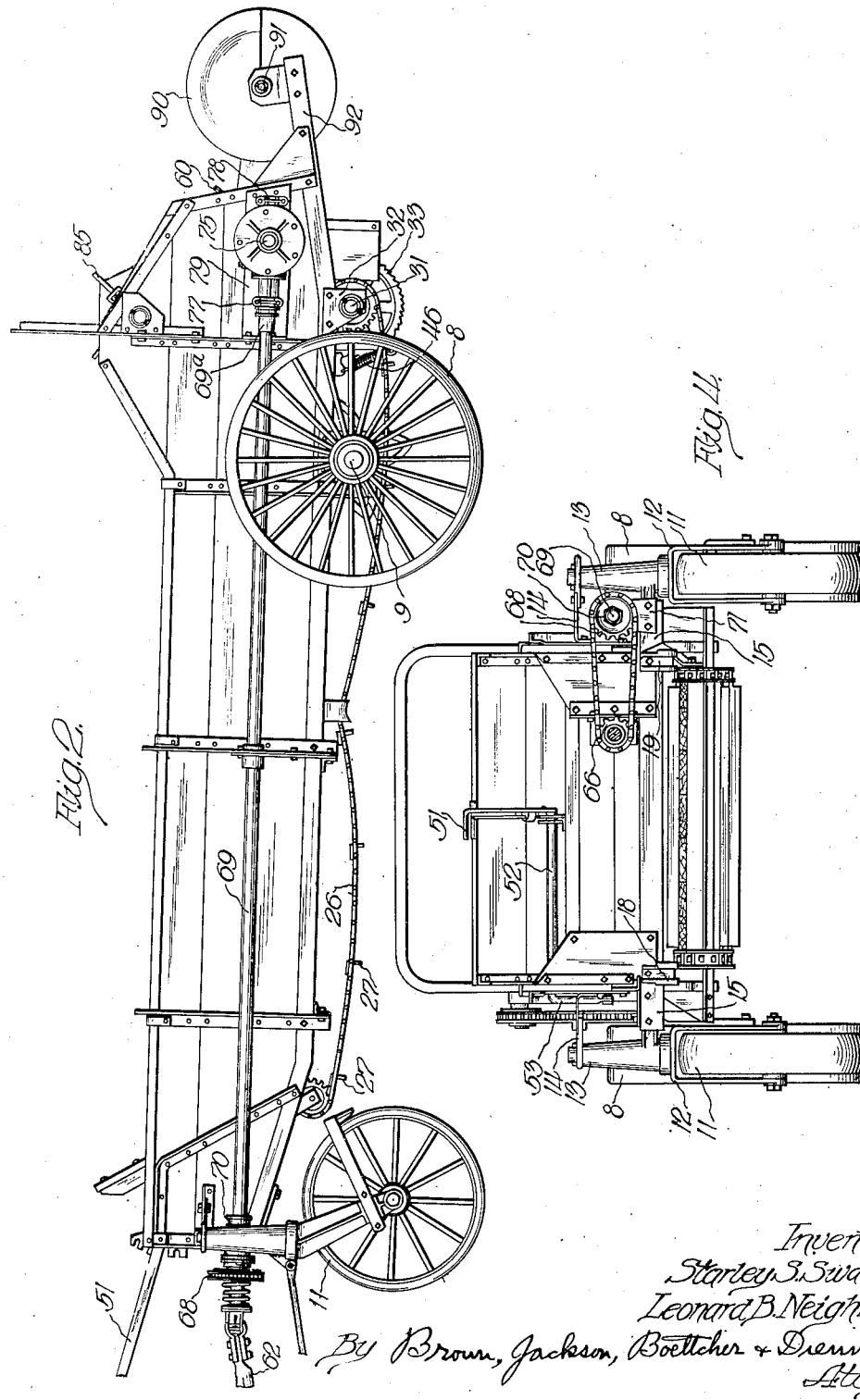
Inventors:
Stanley S. Swanson
Leonard B. Neighbour
By Brown, Jackson, Boettcher & Drenner
Attys.

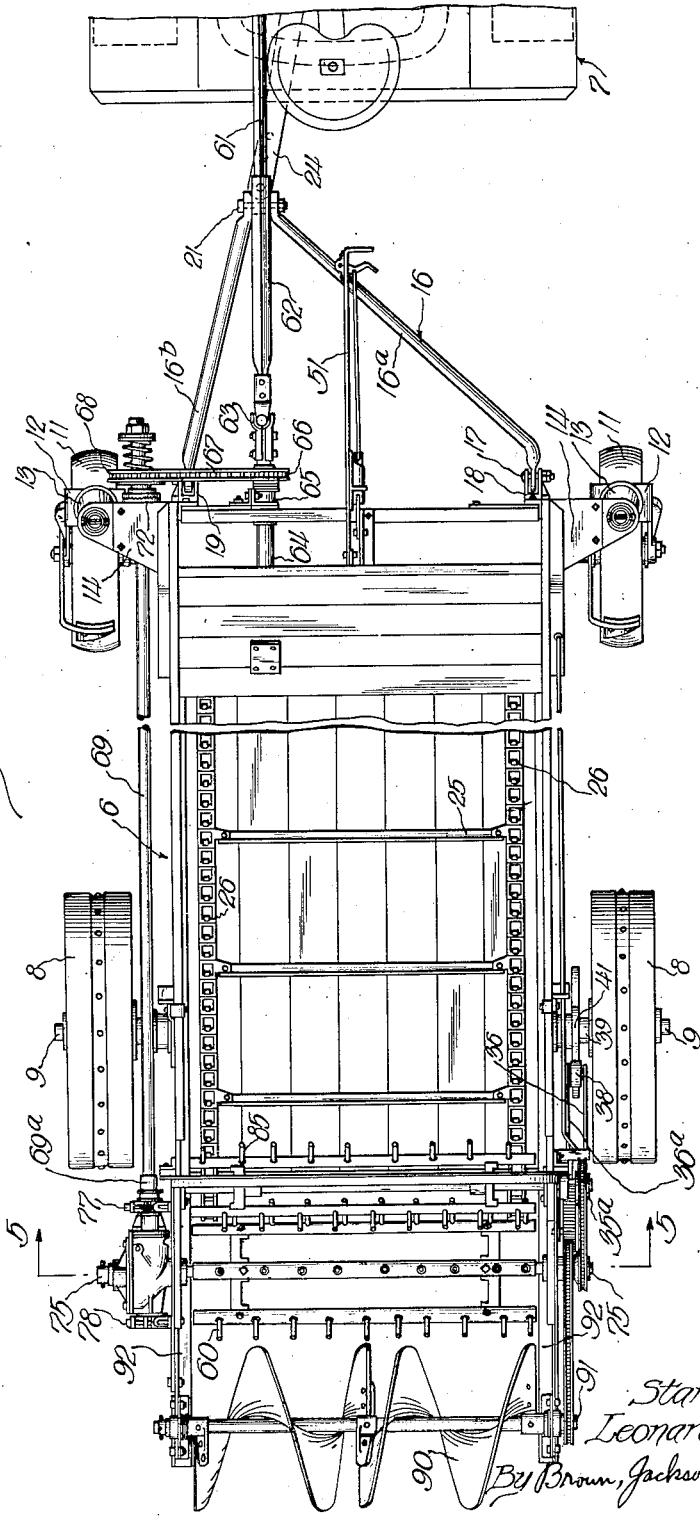

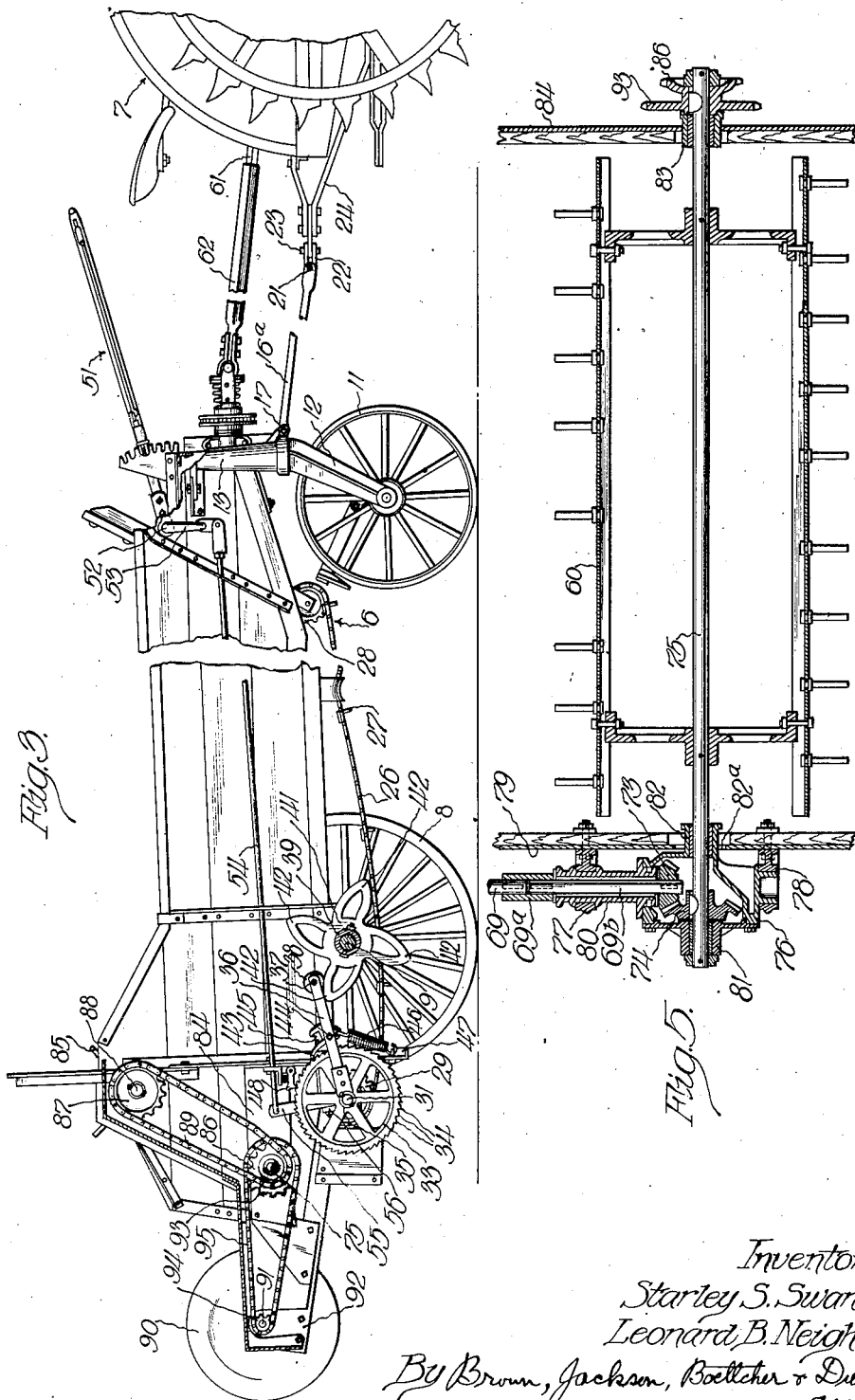

Patented Jan. 30, 1934

1,945,125

UNITED STATES PATENT OFFICE 1,945,125

MANURE SPREADER

Starley S. Swanson and Leonard B. Neighbour, Moline, Ill., assignors to Deere & Company, Moline, Ill., a corporation of Illinois Original application August 12, 1931, Serial No. 556,498. Divided and this application July 11, 1932. Serial No. 621,928

7 Claims. (Cl. 275—3)

The present invention relates to fertilizer distributors of the well known type adapted to be propelled by a tractor having a power take-off connection with the tractor motor, and comprising a vehicle body mounted on front and rear wheels, feeding mechanism and a wide spread device mounted adjacent the rear end of the vehicle body, and a traveling conveyor, the upper course of which feeds the contents of the vehicle gradually rearwardly to the distributing apparatus.

In tractor propelled spreaders wherein the forward end of the body or material carrying box of the spreader is carried by the tractor draw bar or is connected to the front axle of the spreader by means of a center longitudinal king pin with caster wheels or dirigible wheels mounted on the ends of the axle, the spreaded box is supported only at three points, which necessitates that the box be made very rigid and strong in construction to prevent sagging of one or the other of the front corners of the box due to uneven loading and therefore heavier than is desirable. Also, prior constructions wherein the box is carried on four supporting wheels have been found objectionable because it has been necessary to build the box rigid and strong enough to prevent warping thereof when the spreader is following over uneven ground, for if the box is not rigid enough to prevent such warping should one of the front wheels drop into a gully the corner of the box adjacent that wheel will follow down with the wheel causing the rear corner on the same side of the box to rise upwardly, and in such case one end of the beater shaft which is disposed rearwardly a considerable distance from the main or rear axle of the spreader would move vertically relative to the other end of the shaft and cause the shaft to bind in its bearings and prevent or interfere with rotation thereof. The use of such comparatively rigid and heavy material carrying boxes in tractor drawn implements of this type is sometimes objectionable owing to the increased expense of manufacture and the increased cost to the ultimate purchaser, and also because the heavier such implements are made the more expensive they are to operate.

With the above noted objections in view, the principal object of the present invention is to provide a tractor propelled spreader supported on four supporting wheels whereby the material carrying box may be made light in weight and yet will not sag at the front corners on account of uneven loading, and providing improved means for pivotally supporting the bevel gear housing at the rear of the distributor which supports two of the bearings in which the beater shaft is journaled, and the rear end of the driving shaft from which the drive to the beater shaft is transmitted, whereby said housing is free to oscillate or rock about an axis perpendicular to the beater shaft, so that the said two bearings of the beater shaft will automatically align themselves with the other bearing at the opposite side of the distributor in which the opposite end of the beater shaft is journaled upon warping of the box due to the implement being operated over uneven ground, and thus prevent binding of the beater shaft in its bearings.

Other objects and advantageous features will be apparent from the following description of the preferred embodiment of our invention taken in connection with the accompanying drawings, in which:

Figure 1 is a top plan view of a fertilizer distributor connected with the rear end of a tractor and equipped with our improvement;

Figure 2 is a side elevation of the left hand side of the distributor as shown in Figure 1, illustrating the means for driving the beaters and wide spread device from the power take-off of the tractor;

Figure 3 is a side elevation of the right hand side of the distributor as shown in Figure 1, illustrating the means for driving the traveling conveyor by power derived from the rear supporting wheels of the vehicle;

Figure 4 is a front view of the distributor, illustrating the manner in which the front caster wheels are connected to the front of the vehicle body; and Figure 5 is a sectional view taken on the line 5—5 of Figure 1 and illustrating the pivotal connection of the bevel gear housing and the bearing means for the main beater shaft.

Referring to the drawings, the distributor body is indicated as an entirety by the numeral 6, while the tractor, the rear portion of which is diagrammatically illustrated in Figures 1 and 3, is indicated by the numeral 7. The distributor is supported at the rear on two wheels 8 mounted on an axle 9 and provided with ratchets to cause rotation of the axle upon forward movement of the distributor. As such ratchet constructions are old in the implement art it is not deemed necessary to illustrate or describe them herein.

The forward end of the body 6 is supported on caster wheels 11 mounted in forks 12. The upper ends of said forks are journaled in vertical sleeves 13 fixed to the body of the distributor in any suitable manner, as by means of upper and lower brackets 14 and 15 respectively secured to and extending outwardly from the side members of the body at the forward ends thereof. The caster wheels 11 have full castering movement about their vertical axes through 360°, which is very desirable in tractor propelled distributors as the provision of such caster wheels together with our improved tongue construction to be presently described greatly facilitates the backing of the distributor by backing the tractor.

By thus providing a separate supporting wheel at each front corner of the body 6 the necessity for making the body strong and rigid enough to prevent sagging of one or another of the front corners due to uneven loading is avoided, and a flexible body very much lighter in weight and one that will warp when the implement is operating over uneven ground may be utilized. In actual operation there is some flexing of the body or box at all times, and this flexing acts to keep the material from lumping and aids in securing an even distribution. However, where the body is capable of flexing it is necessary to provide bearing means for the beater shafts which will permit such flexing to occur. The bearing means preferably employed to this end will be described in detail later.

For connecting the distributor to the tractor a laterally rigid tongue 16 is provided, said tongue comprising two bars 16a and 16b respectively connected at their rear ends by horizontally extending pivot bolts 17 to brackets 18 and 19 secured to and extending outwardly from the opposite ends of the front portion of the distributor as shown in Figure 1. The forward ends of the bars 16a and 16b converge toward each other as shown and are connected together by a horizontally extending pivot bolt 21 and a pivot connection 22 pivoted at its rear end on said bolt 21. By means of a vertically extending pivot bolt 23, the pivot block 22 connects the front end of the tongue 16 with the rear end of the draw bar 24 of the tractor, as shown in Figure 3. When pulling the distributor the draw bar 24 of the tractor is locked against both vertical and horizontal swinging movement with respect to the tractor in any suitable manner, as is customary in structures of this type. By providing the laterally rigid tongue for connecting the distributor with the tractor and the caster wheels at the forward end of the distributor capable of castering movement about 360°, backing and steering of the distributor upon backing of the tractor is greatly facilitated, as will be readily understood.

The material to be distributed is carried in the body of the distributor and is caused to travel gradually rearwardly therein when the machine is in operation by an endless conveyor or apron 25 of a well known type, which operates in the lower portion of the body and may in some instances form the bottom thereof. This conveyor comprises a pair of laterally spaced horizontally extending endless chains 26 connected together at spaced points therealong by transversely extending slats or bars 27 extending therebetween (see Figure 1). At the front of the load carrying portion of the body, the apron is trained around and supported by sprockets 28, while at the rear of the body the apron is trained around and driven by sprockets 29 fastened on a shaft 31 suitably supported in bearing brackets 32 secured to the sills of the body (see Figure 2).

The conveyor is moved rearwardly by rotation of the shaft 31 by power derived from the rear axle 9 and the means for rotating said shaft upon rotation of said axle to accomplish such movement is best shown in Figure 3 and will now be described. Keyed to the shaft 31 at the side of the body is a wheel 33 provided with ratchet teeth 34 on its periphery. Pivoted upon the shaft 31 and disposed outside of the wheel 33 is a sleeve 35. An arm comprising two laterally spaced members 36 and 36a, extending respectively on the outer and inner sides of the wheel 33 is provided, the rear end of the member 36 being secured to said sleeve 35. The other arm 36a is secured at its rear end to a second sleeve 35a (see Figure 1) pivoted on the shaft 31 on the inner side of the wheel, and the purpose of the arm 36a and sleeve 35a will be hereinafter described. The two members 36, 36a of said arm are connected together at their forward ends by a stud 37, and a roller 38 is journaled on said stud between said members as shown in Figure 1.

Keyed to the rear axle 9 is a sleeve 39 provided with a web 41, the periphery of which is of an irregular shape to form a series of cams 42, which are adapted successively to engage the roller 38 as the axle 9 turns. As viewed in Figure 3, when the roller is in engagement with one of the cams clockwise rotation of the sleeve 39 and the cams 42 upon forward movement of the distributor will force the outer or forward end of the arm 36 upwardly, the roller traveling along the face of the cam 42. A dog 43 which is pivotally connected to the arm 36 by a pivot stud 44 and which is pressed against the teeth 34 of the wheel 33 by a spring 45, will cause the wheel to rotate with the arm during its upward movement and, consequently, drive the shaft 31 and move the conveyor rearwardly of the body. When the roller travels off the end of the cam 42 the arm 36 is caused to swing downwardly into position to be engaged by the next succeeding cam by a spring 46, one end of which is suitably secured to the arm 36 and the other end of which is connected with a bracket 47 fastened to the side of the body. It is of course understood that upon the downward or return swing of the arm the dog 43 will ratchet over the teeth of the wheel 33. During such return movement of the arm 36, the wheel is held against reverse movement by a spring pressed dog 48 secured to the side of the body and adapted to engage the ratchet teeth, as is usual in such constructions.

The amount of movement imparted to the wheel 33 upon each downward movement of the arm 36, and consequently the extent to which the apron 25 is moved toward the distributing mechanism at the rear of the distributor, is governed by a detent lever 51 fixed to a shaft 52 supported at the forward end of the body and having a depending arm 53. A rod 54 pivotally connected at one end to the lower end of the arm 53 extends longitudinally rearwardly and has its opposite end pivotally connected to an arm 55 pivotally mounted on the shaft 31 of the ratchet mechanism. The position of this arm 55 controls the degree of angular movement given to the ratchet arm 36 through its contact with a stop member 56 fixed to and extending upwardly from the inner member 36a of the arm 36. When the arm 55 is in its forwardmost position the arm 36 is permitted to move downwardly its maximum distance, whereupon rotation of the cam wheel 42 will shift the conveyor its maximum extent.

The distributing mechanism comprises a main beater, an auxiliary beater and a wide spread device, and these parts together with the mechanism for driving the same will now be described. The main beater of the distributor is indicated by the reference numeral 60, and its driven from the power take-off shaft 61 of the tractor. Said power take-off shaft extends longitudinally rearwardly from the tractor and is square in cross section (see Figures 1 and 3). This power take-off shaft telescopes within a longitudinally extending tubular shaft 62 provided with a square bore for receiving said first shaft, whereby said tubular shaft is driven by said power take-off shaft. The tubular shaft is connected by a universal joint connection 63 with a third longitudinally extending shaft 64 supported in suitable bearings provided at the forward portion of the body 6, one of said bearings being shown in Figure 1 and indicated by the numeral 65. Keyed to said third shaft between the bearing 65 and the universal joint connection 63 is a sprocket 66 around which is trained a chain 67, said chain being also trained around a second sprocket 68 having driving connection with a long longitudinally extending shaft 69 positioned alongside the body 6 whereby said shaft 69 is driven by the power take-off shaft of the tractor by the various parts just described, as will be readily understood. The forward end of the shaft 69 is supported in a bearing 70 supported by a bracket 71 suitably secured to the side of the body of the distributor. A spring controlled slip clutch 72 is provided in the line of the shaft 69 in rear of the sprocket 68 for a purpose to be hereinafter described.

The shaft 69 extends rearwardly to a point adjacent the rear end of the body and its rear end is keyed to a connecting collar 69a which in turn is keyed to the forward end of a stub shaft 69b. Fixed on the rear end of said shaft 69b as shown in Figure 5 is a bevel gear 73 which meshes with a second bevel gear 74 fixed on the adjacent end of a transversely extending shaft 75 which carries and drives the main beater 60 before mentioned. In order to compensate for the warping of the body and prevent binding of the shaft 80 and beater shaft 75 in their supporting bearings improved means for supporting said shafts on the body of the implement has been provided, and such means will now be described.

The bevel gears 73 and 74 are enclosed by a suitable housing 76 pivotally supported for rocking movement about a longitudinal axis in bearing brackets 77 and 78 fixed to a plate 79 suitably secured to the side of the body (see Figures 2 and 5). The stub shaft 69b enters the housing 76 through a sleeve 80 carried by the housing, in which sleeve the shaft is journaled on an axis concentric with the axis about which the housing 76 is free to rock, i. e., the pivot axes between the housing and the brackets 77 and 78.

One end of the main beater shaft 75 is journaled in transversely extending bearings 81 and 82 provided in the housing 76, while the opposite end of said shaft is journaled in a third bearing 83 at the opposite side of the body. The bearing 82 extends through an enlarged hole 82a in the plate 79, to permit vertical movement of the bearing as will be presently described. The bearing 83 is suitably supported for limited displacement in a plate 84 (see Figures 3 and 5) suitably fixed to the right hand side of the body. By the foregoing construction the housing 76 is free to rock in the bearings 77 and 78, and the bearings 81 and 82 at the left hand end of the shaft 75 as shown in Figure 5 will automatically align themselves with the bearing 83, this alignment being permitted by clearance of the bearing 82 in the perforation 82a provided in the plate 79 as above described and the movement of the bearing 83 in the plate 84.

It will be seen from the foregoing by providing the housing 76 pivotally supported at the side of the body for vertical movement, which housing carries the bearing sleeve 80 for the stub shaft 69b and the bearings 81 and 82 for the main beater shaft 75, and also providing the enlarged hole 82a in the plate 79 on the side of the body 6 through which the beater shaft 75 and bearing 82 extend, a body which is light in weight and capable of warping to a considerable extent when the implement is operating over uneven ground may be provided without any danger of binding of the stub shaft 69b in its bearing sleeve 80 or binding of the shaft 75 in its bearings 81 and 82, as the housing is free to rock in its bearings 77 and 78 and the bearing 82 is free to move vertically in the hole 82a upon such warping of the body.

The distributor is also provided with an auxiliary beater 85 positioned above and forward of the main beater 60, as is usual in machines of this type (see Figures 1 and 3). The auxiliary beater is driven from the shaft 75 of the main beater 60 through the instrumentality of a sprocket 86 keyed to said shaft, a second sprocket 87 keyed to the shaft 88 of the auxiliary beater 85, and a chain 89 trained around said sprockets, as shown in Figure 3.

A wide spread device of the usual construction is located in rear of the main beater 60 and indicated by the numeral 90, and the shaft 91 of said wide spread device is suitably supported in bearings carried by extensions 92 suitably secured to and extending rearwardly from the side members of the body of the distributor, as is usual in structures of this character. The wide spread device is driven from the main beater shaft 75 through the instrumentality of a sprocket 93 preferably but not necessarily cast integral with the sprocket 86 mounted on the shaft 75, a second sprocket 94 keyed to the shaft 91 of the wide spread device, and a chain 95 trained around said sprocket, as is shown in Figure 3.

It will be seen from the foregoing that the main and auxiliary beaters, and also the wide spread device, are all driven from the power take-off connection with the tractor. As the speed of the motor of the tractor, and therefore also the speed of the power take-off shaft driven thereby, is maintained substantially constant by reason of the governor control with which farm tractors of this type are provided, irrespective of whether the tractor is being operated in low gear or in high gear, the beaters and wide spread device are also driven at a constant speed, which is very desirable as before explained.

The traveling conveyor or apron being connected with and driven from the axle 9 of the rear supporting wheels 8 of the distributor as above described, the speed of such apron will be automatically proportional to the speed of forward advance of the distributor. For example, if the tractor is thrown into low gear the speed of forward travel of the distributor will be correspondingly slowed up, which will automatically slow up the speed of the apron driven from the ground wheels 8 of the distributor, whereas when the tractor is thrown into high gear the distributor will travel at a higher rate of speed which will automatically increase the speed of the apron, as will be readily understood, yet the speed of the beater mechanism will remain substantially constant. While we have illustrated in the drawings and described herein a construction wherein the beaters and wide spread device are driven at a constant speed regardless of the rate of speed of forward advance of the vehicle while the traveling conveyor which feeds the manure or other material to the beaters is driven at a speed proportionate to the rate of forward advance of the vehicle, such driving of the beaters and conveyor has nothing to do with the present invention and forms a part of the subject-matter of our pending application, Serial No. 556,498, filed August 12, 1931, of which application the present application is a division.

The spring controlled clutch 72 adjacent the forward end of the shaft 69 is provided so that in case the main beater 60 or other parts driven by the shaft 69 becomes clogged with fertilizer, or are prevented from rotating from one cause or another, the clutch 72 will be thrown out, breaking the driving connection between the shaft 69 and the sprocket 68 which is being driven from the sprocket 66 on shaft 64 which is in turn driven by the power take-off shaft, thereby preventing breakage of parts which might otherwise occur if this clutch were not provided, as will be readily understood.

We claim:

1. A fertilizer distributor having side walls comprising, in combination, a rotating beater shaft, bearings supporting said shaft, a member supporting one of said bearings, the other of said bearings being supported by a side wall of the distributor, and means for supporting said member for rocking movement about an axis perpendicular to said shaft.

2. A fertilizer distributor comprising, in combination, a rotating beater shaft, driving means for said shaft, a housing enclosing said driving means, bearings for said shaft, two of said bearings being carried by said housing, and means for supporting said housing for rocking movement about an axis perpendicular to said beater shaft.

3. A fertilizer distributor comprising, in combination, a rotating beater shaft, beveled gears for rotating said shaft, a housing enclosing said beveled gears, and means supporting said housing for rocking movement about an axis perpendicular to said shaft, one of said beveled gears being mounted on a shaft journaled in the housing concentric with the axis about which the housing is free to swing.

4. A fertilizer distributor comprising, in combination, a rotating beater shaft, driving means for said shaft, a housing enclosing said driving means, a pair of bearings for supporting one end of said shaft, a third bearing for supporting the opposite end of said shaft, and means pivotally connecting said housing with said distributor for vertical oscillation about an axis perpendicular to said beater shaft whereby the pair of bearings at one end of said beater shaft automatically aline themselves with the third bearing in which the opposite end of said beater shaft is journaled.

5. A fertilizer distributor comprising a vehicle body including, in combination, a rotating beater shaft, driving means for said shaft, a housing enclosing said driving means, means pivotally connecting said housing with the distributor for vertical movement relative thereto, a bearing for one end of said shaft supported in said housing, a bearing for the opposite end of said shaft, an intermediate bearing for said shaft supported in said housing and extending through an enlarged vertically extending slot in the side wall of said body, whereby said intermediate bearing may move vertically in said slot upon vertical movement of the housing for automatically aligning all of said bearings.

6. A fertilizer distributor comprising in combination, a flexible body, means for supporting said body at four spaced points on the ground, a rotating beater shaft, bearings supporting said shaft, and means for supporting said bearings for rocking movement about an axis perpendicular to said shaft, whereby the bearings for said shaft will automatically aline themselves upon warping of the body due to operation over uneven ground.

7. A fertilizer distributor comprising in combination, a body, a separate wheel support near each corner of said body, a rotating beater shaft, driving means for said shaft, a housing enclosing said driving means, means pivotally connecting said housing with the body for vertical movement relative thereto, a bearing for one end of said shaft supported in said housing, a bearing for the opposite end of said shaft, an intermediate bearing for said shaft supported in said housing and extending through an enlarged vertically extending slot in the side wall of said body, whereby said intermediate bearing may move generally vertically in said slot upon rocking movement of the housing for automatically aligning all of said bearings upon warping of said body when the vehicle is operating over uneven ground.

STARLEY S. SWANSON.
LEONARD B. NEIGHBOUR.